(12) United States Patent
Hsu et al.

(10) Patent No.: US 6,972,816 B2
(45) Date of Patent: Dec. 6, 2005

(54) RETARDATION DEVICE FOR A LIQUID CRYSTAL DISPLAY

(75) Inventors: Jung-Hung Hsu, Taoyuan (TW); Long-Hai Wu, Taoyuan (TW); Chien-Wei Tsou, Taoyuan (TW)

(73) Assignee: Optimax Technology Corporation, Taoyuan (TW)

( * ) Notice: Subject to any disclaimer, the term of this patent is extended or adjusted under 35 U.S.C. 154(b) by 29 days.

(21) Appl. No.: 10/704,722

(22) Filed: Nov. 12, 2003

(65) Prior Publication Data

US 2005/0099563 A1 May 12, 2005

(51) Int. Cl.[7] ............................................. G02F 1/1335
(52) U.S. Cl. ........................................ 349/119; 349/96
(58) Field of Search .................... 349/117–121, 96–103

(56) References Cited

U.S. PATENT DOCUMENTS 5,818,559 A * 10/1998 Yoshida ....................... 349/122
6,762,811 B2 * 7/2004 Sasaki et al. ................ 349/118

* cited by examiner

Primary Examiner—Dung T. Nguyen
(74) Attorney, Agent, or Firm—Alan D. Kamrath; Nikolai & Mersereau, P.A.

(57) ABSTRACT

The present invention is related to a retardation device for a liquid crystal display and comprises: an upper retardation device, which has a plurality of retardation layers; a lower retardation device, which has a plurality of retardation layers as well; a LC cell layer, which is between the upper retardation device and the lower retardation device. The present invention adopts a set of retardation plates organized by the upper retardation device and the lower retardation device to apply on a MVA-LCD (Multi-domain Vertical Alignment Liquid Crystal Display) with features of high contrast and wide view angles to promote the contrast and the view angle.

3 Claims, 8 Drawing Sheets

Prior Arts

Prior Arts

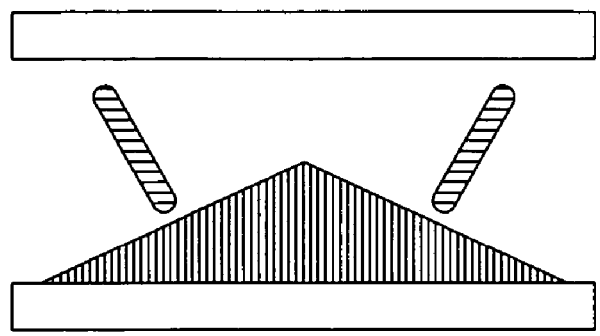
Fig. 3A
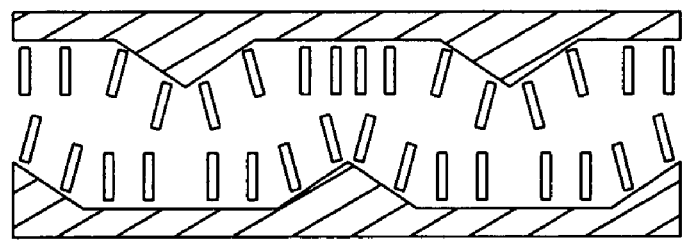
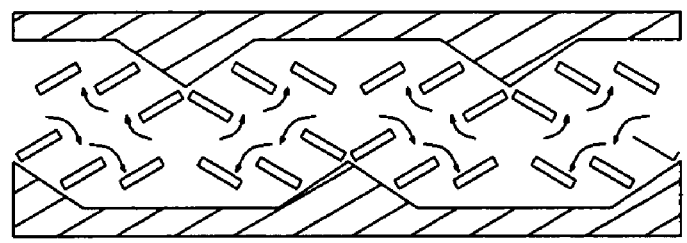
Fig. 3B
Prior Arts

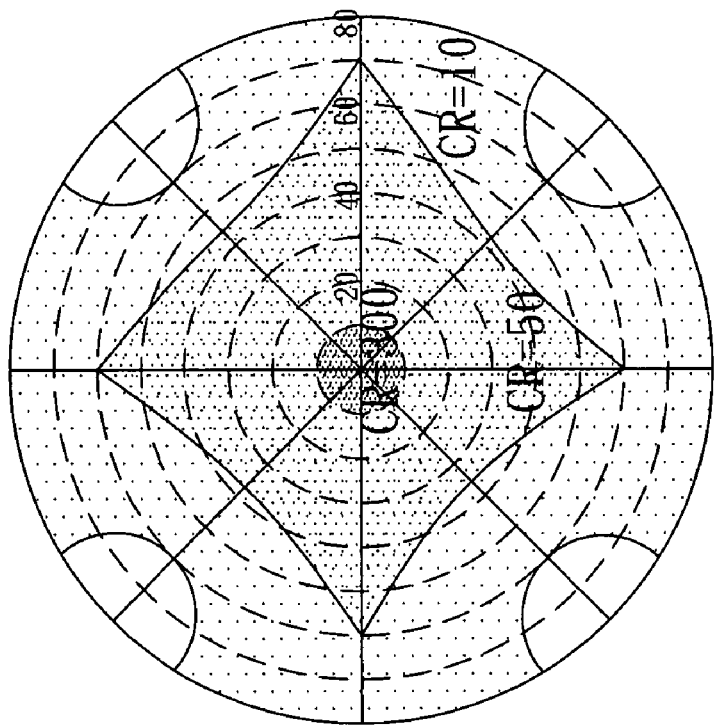
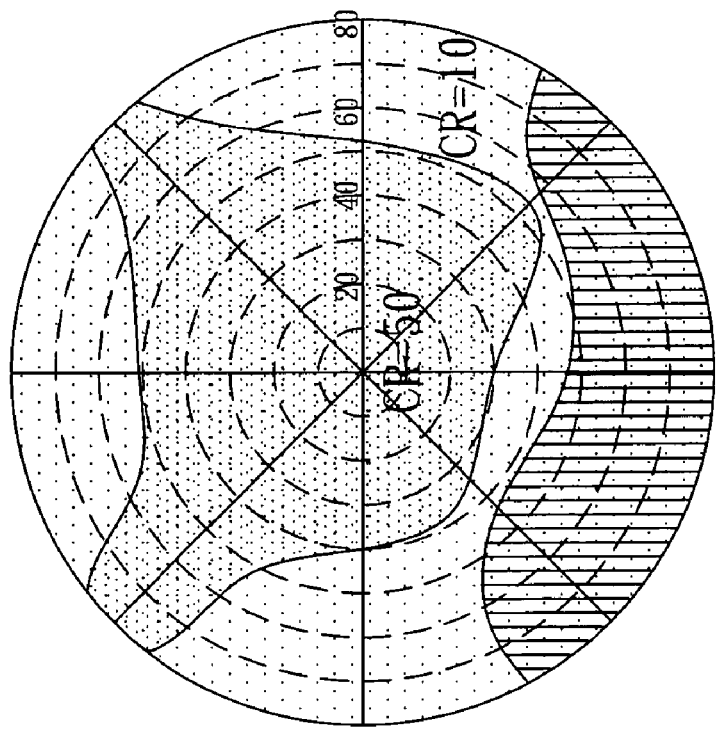
Fig. 5
Prior Arts

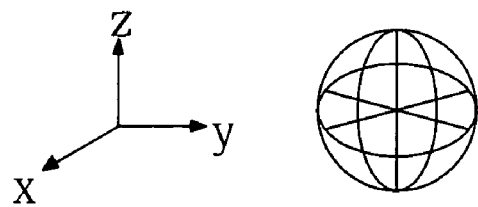 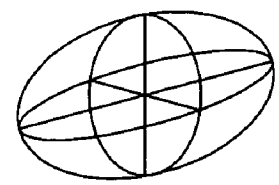
Fig. 6A                    Fig. 6B
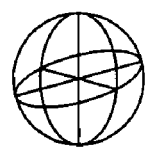 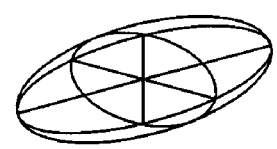
Fig. 6C                    Fig. 6D
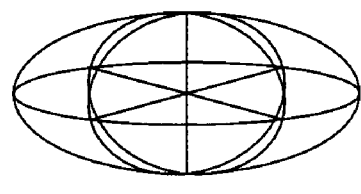 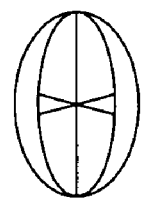
Fig. 6E                    Fig. 6F

RETARDATION DEVICE FOR A LIQUID CRYSTAL DISPLAY

BACKGROUND OF THE INVENTION

1. Field of the Invention

The present invention generally relates to a retardation device for a liquid crystal display, especially to the retardation device whom applying polarizing plates onto MVA-LCD (Multi-domain Vertical Alignment Liquid Crystal Display) with high contrast and wide-angle features for promoting LCDs' contrast and view angle.

2. Description of the Prior Art

Since the past one decade, the field of optoelectronics is full of vitality, and computer accessories are developed toward light, thin, power-saving and low radiation according to the trends of the optoelectronics field. Traditional CRT (Cathode Ray Tube) is out of fashion due to its huge volume, heavy weight, radiation, etc. Hence, LCD is the product to figure out the shortcomings of the prior arts in display fields. At the initial stage of LCD, some shadow is displayed on screen and different colors may also permeate each other due to the technology for retardation being not fully developed. A phase difference is caused by that crystalline grains of a LC cell of a LCD are arranged by an inclined phenomenon to make happen diffraction, refraction, etc. while the LCD being electrified. However, the needs in markets for PDA, tablet PC, LC TV, etc. are gradually higher day after day, thus the LCD with high quality is relatively more as well.

The most two disadvantages of the present LCD are narrow view angle and chromatic aberration. To overcome the technical problem of the narrow view angle, scientists have improved a couple of displaying methods, one is named TFT LCD (Thin Film Transistor LCD) with MVA (Multi-domain Vertical Alignment), which adopts a new concept of arrangement to enhance contrast, saturation, response time, etc.

Following is a report, titled "Super High Quality MVA TFT Liquid Crystal Display", presented by Mr. Yoshio Koike and Dr. Kenji Okamoto, and it will be discussed for three kinds of LCD in prior arts related from the report. Please refer to FIGS. 1A, 1B and 1C, which are sketches of arranging a single crystalline grain of three prior arts. The three prior arts are TN (Twisted Nematic) LCD in FIG. 1A, IPS (IN-plane-switching) LCD in FIG. 1B and VA (Vertically Aligned) LCD in FIG. 1C, all of them being derived from different operational theories. Traditionally, crystalline grains of TN mode are almost parallel to two substrates while the TN LCD being not electrified, shown at the left side of the dot-line in FIG. 1A. The plurality of crystalline grains between the two substrates are inclined each other, and more, the total inclined angle from a crystalline grain close to an upper substrate to a crystalline grain close to a lower substrate is about 90°. When electrical field is not applied in a LCD and light goes through the LCD, a plurality of polarized plates in the upper substrate, a LC cell layer between the upper substrate and the lower substrate and a plurality of polarized plates in the lower substrate are through by the light, thus the color on the LCD is white; on the other hand, when the LCD is electrified and light goes through the LCD, the twisted crystalline grains are changed to a state of almost vertical crystalline grains, the light passes through the LC cell layer but not twisted by the vertical crystalline grains, and continuously the light is blocked while it meets the plurality of polarized plates in the lower substrate, hence the color on the LCD is black. At the TN mode, not all of the crystalline grains are vertical even though electrical field is fully applied, shown at the right side of the dot-line in FIG. 1A, therefore the black color is not dark enough, which means a phenomenon of light leak is caused. While applying a middle stage of voltage, a situation of multiple arrangements of the crystalline grains is generated, and it brings about different view angles with different images, that is, to watch the LCD with different view angles other than a front view may loose the truth.

For the IPS mode, shown in FIG. 1B, the crystalline grains are parallel to both substrates, and the angles for incline and twist shall be depending on how many voltages being applied; this is to conquer an issue of narrow view angle derived from polarized crystalline grains. Further, there are some wavelengths spread between the two substrates, transmission may vary by different colors, that is, some colors will be different due to variable view angles and applied voltages. Besides, the response for IPS is slow due to the crystalline grains existing and being twisted in the weak electrical field between the two substrates. The electrical field is consisted by a pair of electrodes with precise molding. A distance of the two electrodes is wider than a distance between the two substrates, and a response speed for the LCD in prior arts can be determined.

Referring to FIG. 1C, VA mode differs TN and IPS modes. For VA mode, the crystalline grains are vertical to two substrates while no voltage is applied, shown at the left side of the dot-line in FIG. 1C, therefore a color performing on the VA-LCD is black; during applying voltages, shown at the right side of the dot-line in FIG. 1C, the crystalline grains are parallel to two substrates to present a white color on the LCD. An important point to mention that all of the crystalline grains, including those around boundaries of the two substrates, are perpendicular. At the stage, light is not interrupted while it goes through the LC cell layer, but light is blocked by following polarized plates. Since this is a sort of complete obstruction, the black color generated by the obstruction on the LCD is all black, therefore the black color is always same with different view angle. The VA mode features quick response without twisted or inclined structure, and the crystalline grains can be adjusted only between vertical and horizontal directions. Besides, the view angle for VA mode is categorized at a middle stage.

Please refer to FIGS. 2A and 2B, which are comparison sketches of a mono-domain vertical alignment LCD and a multi-domain vertical alignment in prior arts. FIG. 2A shows that crystalline grains in vertical alignment being incline averagely to display a middle level. Because of the average alignment, view angle is a key role for brightness. For a front view, a double refraction effect of the inclined grains makes that partial light can be seen. For a view from the incline direction, the double refraction effect is disappeared, and the color is black. For a view from an angle perpendicular to the incline direction, the double refraction effect has been fully played to represent a high level of brightness.

To conquer the situation in FIG. 2A, a multi-domain vertical alignment is thus produced. Referring to FIG. 2B, the crystalline grains are distributed symmetrically, that is, the grains at one side are inclined corresponding to another. For instance, FIG. 2B shows two areas with two different incline angles, and to define each area to be a tiny region, therefore organizing many tiny regions may promote the brightness and the view angle. Referring to FIGS. 3A and 3B, which are sketches of the LC cell layer of the multi-domain vertical alignment in prior arts. The new technology without rubbing for LC alignment has being developed recently, that is, to shape a plurality of ridges on both substrates to let grains be inclined. While applying some voltages onto both substrates, grains are inclined in an incline electrical field of a ridge area as shown in FIG. 3A. The method is that a format to form a ridge area due to a direction of the incline electrical field being same as a direction of the grains on the ridge. Based on the method, the grains are automatically divided into two areas, a view angle of one of the two areas is reverse to another, and therefore a cell with a wide view angle is produced. The method is called Automatic Domain Formation (ADF). Referring to FIG. 3B, which shows a plurality of ridges on both substrates to further stabilize the LC cell layer. By way of ADF, it is an easy way to gain any LC area, especially to a structure with plural ridges; however, to make several grooves on substrates is another way to gain LC area. During the past years, combining two of aforesaid approaches another stage of effect.

Referring to FIG. 4, which is a sketch of a TFT-LCD with a plurality of stripe ridges in prior arts and shows a four-area MVA-LCD (Multi-domain Vertical Alignment Liquid Crystal Display) with sawtooth ridges. For the technology of developed TFT-LCD, four areas are determined to let VA-LCD fully play. Wherein, each absorbing axis between polarized plates has an angle of 45° with each long axis of a LC grain, and the utilization of light is almost completely developed.

Referring to FIG. 5, which are comparison sketches of a VA-LCD and a MVA-LCD in prior arts. A left view of FIG. 5 shows a presentation of the VA-LCD in a view angle of 0° to result a contrast value of 50, and another contrast value of 10 while in a view angle of 80°; a right view for MVA-LCD represents two contrast values 300 and 10 while in two view angles of 0° and 80°. A charcoal gray area and a light gray area in the right view are averagely distributed, that is, phase differences are regular; on the other hand, a charcoal gray area and a light gray area in the left view are abnormally distributed.

According to above mention, to improve the view angle and the contrast value of the present MVA-LCD, most of polarized plates adopt biaxial films to engage compensation of phase differences so as to improve a new stage of the view angle of 80° while in the contract value of 10. Although the present compensation is capable of expanding a normal view angle to a full view angle, the contrast value still cannot be distributed effectively, especially to that the contrast value being not greater than 20 for view angles from 45° to 225° and view angles from 135° to 315°. Thus, how to develop a method of phase difference to advance the contract values of afore two categories of view angles to be 20 or even more is the issue discussed in the present invention.

SUMMARY OF THE INVENTION

The main objective of the present invention is to offer a retardation device for a liquid crystal display to employ a plurality of polarized plates to MVA-LCD for improving contrast and view angle, such as contrast values of view angles from 45° to 225° and view angles from 135° to 3150 being 20 or more.

The present invention comprises an upper retardation set, a LC cell layer and a lower retardation set; wherein the upper retardation set including a plural of retardation layers, such as a transparent substrate, a polarized component and another transparent substrate aligned from an upper layer to a lower layer; the lower retardation set including a plural of retardation layers, such as a first biaxial film, a second biaxial film, a polarized component and a transparent substrate aligned from an upper layer to a lower layer; and each of the upper retardation set and the lower retardation set covered by a shielding layer processed by surface treatment.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein:

FIGS. 3A and 3B, which are sketches of the LC cell layer of the multi-domain vertical alignment in prior arts.

FIG. 5 are comparison sketches of a VA-LCD and a MVA-LCD in prior arts.

FIGS. 6A to 6F, which are sketches of physical characters of a retardation film in optoelectronics field.

DETAILED DESCRIPTION OF THE INVENTION

Referring to FIGS. 6A to 6F, which are sketches of physical characters of a retardation film in optoelectronics field. As shown in FIG. 6A, which is a coordination chart defining three coordination axes x, y and z. Generally retardation film has been divided by three, A-plate shown as FIG. 6B and FIG. 6C, C-plate shown as FIG. 6E and FIG. 6F and biaxial film shown as 6D. A-plate has a p-A-plate (positive A-plate) shown as FIG. 6B and a n-A-plate (negative A-plate) shown as FIG. 6C, the two physical characters of the p-A-plate and n-A-plate are:

p-A-plate: nx>ny=nz, n-A-plate: nz=nx>ny;

C-plate has a p-C-plate (positive C-plate) shown as FIG. 6F and a n-C-plate (negative C-plate) shown as FIG. 6E, the two physical characters of the p-C-plate and n-C-plate are:

p-C-plate: nz>nx=ny, n-C-plate: nx=ny>nz;

the characters of the biaxial film shown as FIG. 6D are nx>ny>nz, wherein nx is defined as the refraction rate of the x axis, ny is defined as the refraction rate of the y axis and nz is defined as the refraction rate of the z axis. Accordingly, the following equation is defined a plane refraction of R0 and a thickness refraction of Rth, such as:

$R0=(nx-ny)*d$, $Rth=(((nx+ny)/2)-nz)*d$ or $Rth=(nx-nz)*d$, wherein $d$ is defined as a path of light going through a medium.

Depending on above description, the refraction rate of the x axis for p-A-plate is the greatest, the refraction rates of the y and z axes are equal; the refraction rate of the y axis for n-A-plate is the smallest, the refraction rates of the x and z axes are equal; the refraction rate of the z axis for p-C-plate is the greatest, the refraction rates of the y and x axes are equal; the refraction rate of the z axis for n-C-plate is the smallest, the refraction rates of the y and x axes are equal; the refraction rate of the x axis for biaxial film is the greatest, the refraction rate alone the y axis is middle, and the smallest being for the refraction rate of the z axis.

Figure 1A:
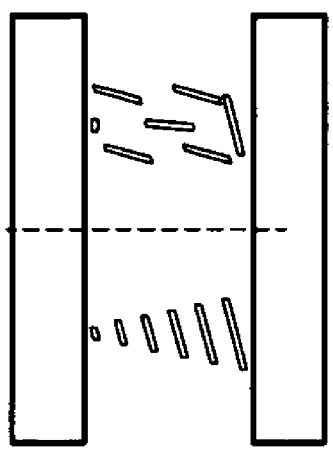
FIGS. 1A to 1C, which are sketches of arranging a single crystalline grain of three prior arts.
Figure 1B:
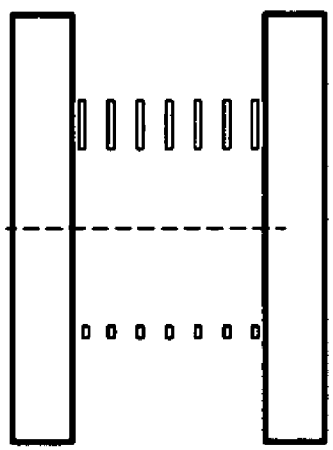
Figure 1C:
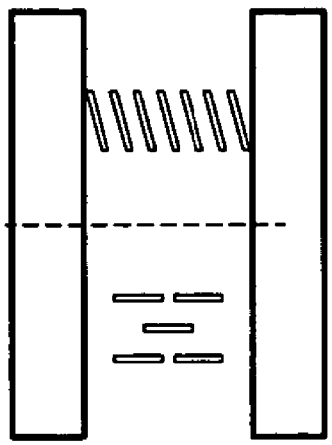
Figure 2A:
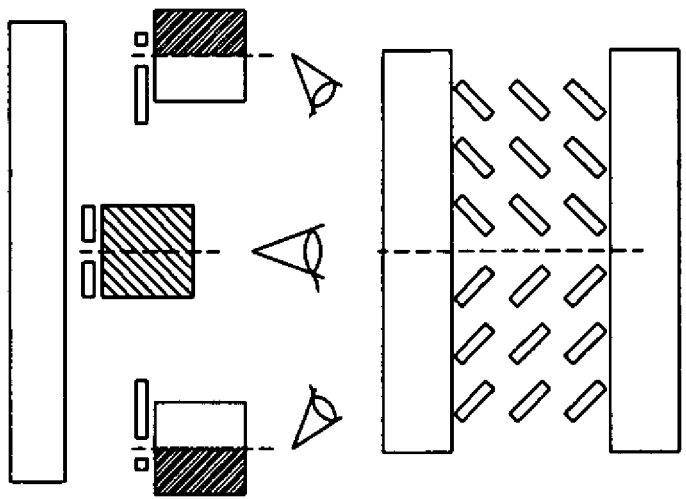
FIGS. 2A and 2B, which are comparison sketches of a mono-domain vertical alignment LCD and a multi-domain vertical alignment in prior arts.
Figure 2B:
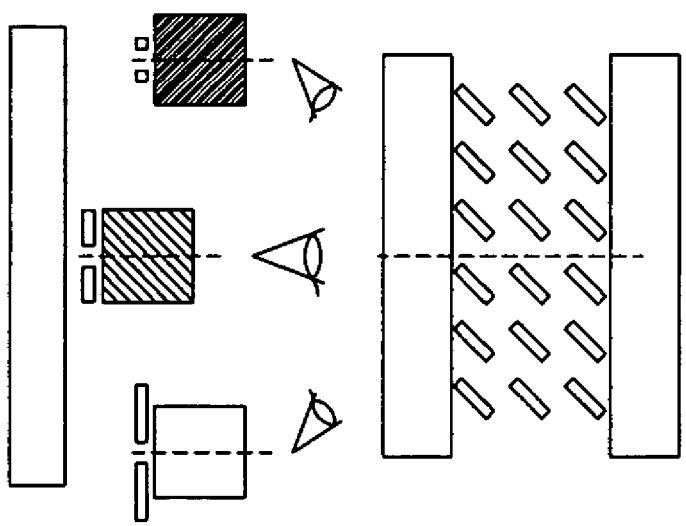
Figure 4:
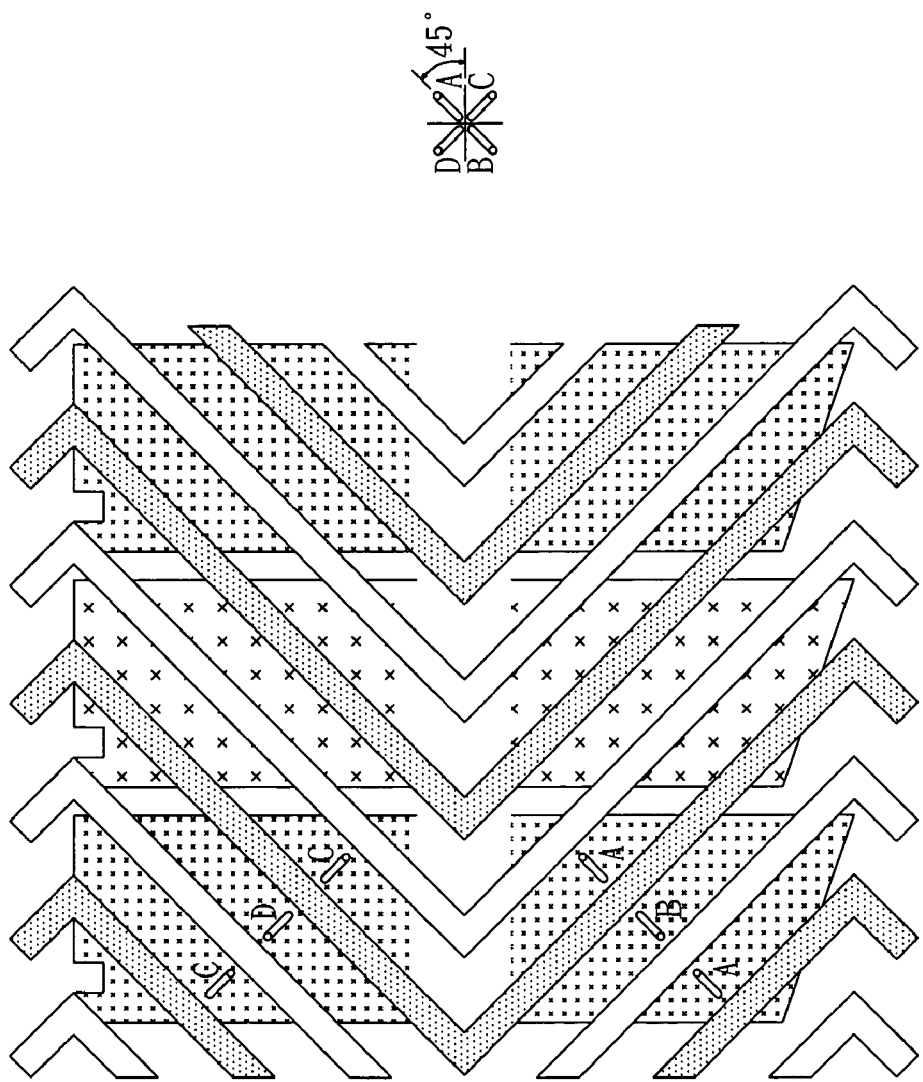
FIG. 4 is a sketch of a TFT-LCD with a plurality of stripe ridges in prior arts and shows a four-area MVA-LCD (Multi-domain Vertical Alignment Liquid Crystal Display) with sawtooth ridges.
Figure 7A:
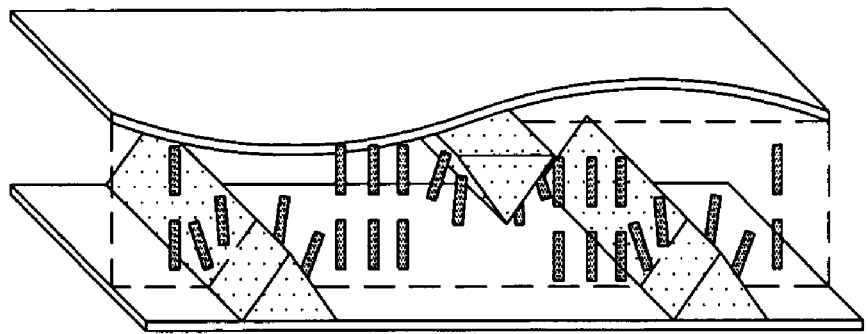
FIGS. 7A and 7B, which are alignment sketches of a LC cell layer of a multi-domain vertical alignment liquid crystal display.
Figure 7B:
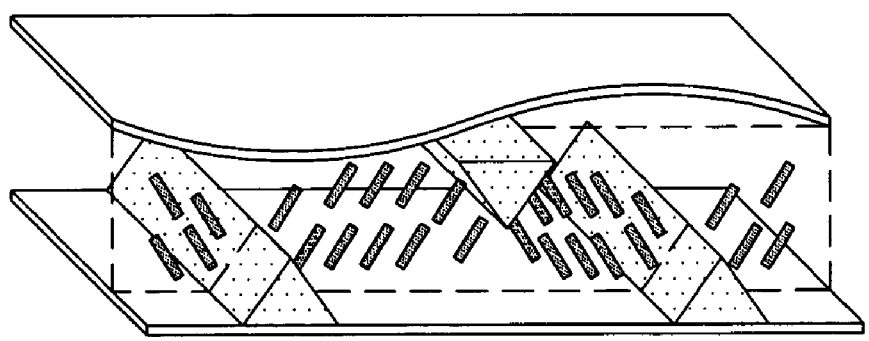

Referring to FIGS. 7A and 7B, which are alignment sketches of a LC cell layer of a multi-domain vertical alignment liquid crystal display, and shows two stages of vertical grains and inclined grains of MVA-LCD. While in an "off" state, that is, there is no electrical field existed, shown in FIG. 7A, almost each grain is perpendicular to two substrates, and a dark state on the LCD at the "off" state; while in an "on" state, which means some voltages being applied in, shown in FIG. 7B, and almost each grain is inclined to two substrates to present a light state on the LCD.

Figure 8:
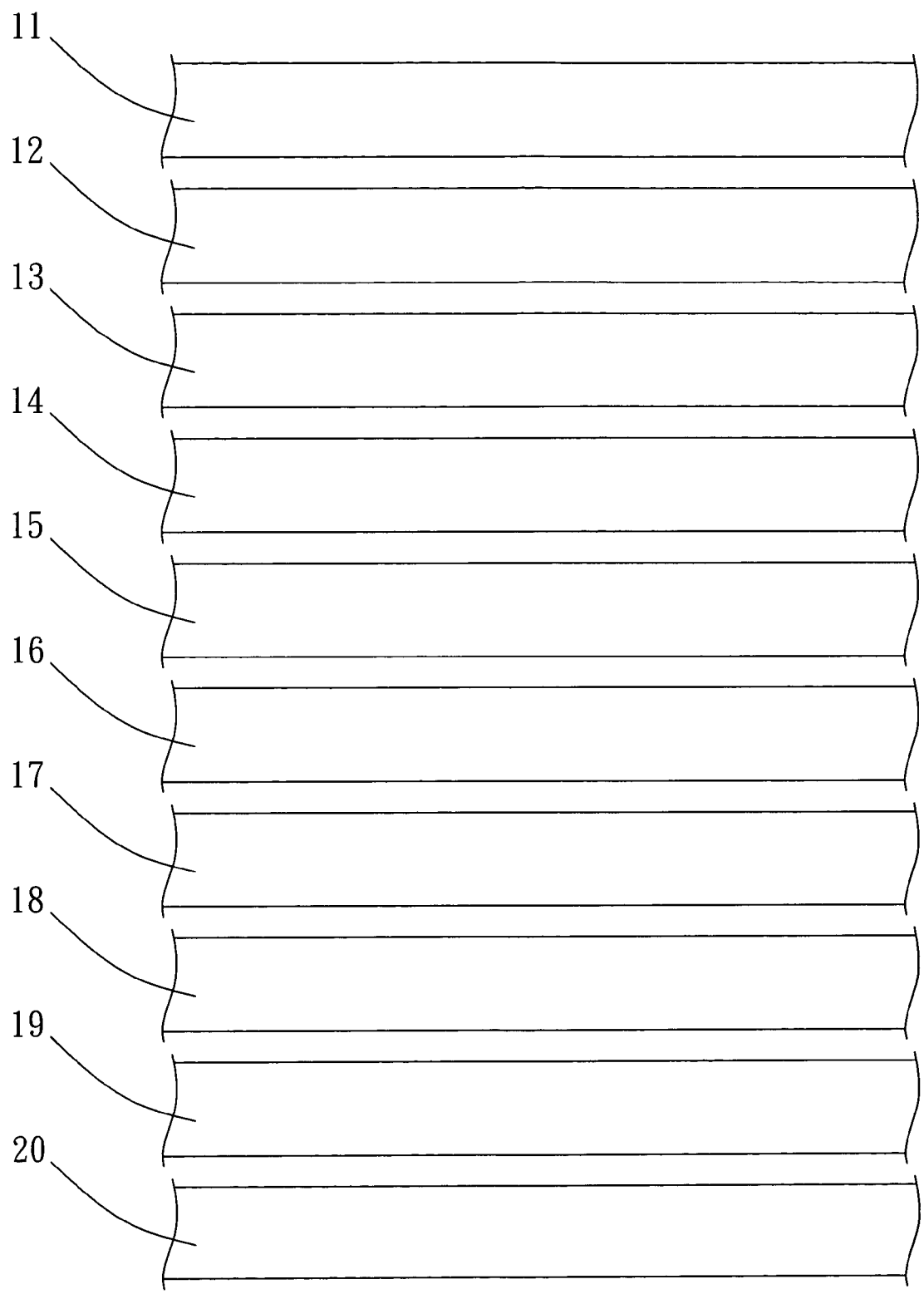
FIG. 8 is an alignment sketch of a preferred embodiment of the present invention.

Referring to FIG. 8, which is an alignment sketch of a preferred embodiment of the present invention. The LC cell layer in FIG. 6 is now arranged in a middle portion as a LC cell layer 15. The present invention discusses that how to compensate the phase differences while the LC cell layer 15 being in dark state or light state. The embodiment mainly organizes a LCD, the alignment sequence of the LCD from a top to a bottom is an upper surface treatment layer 11; an upper polarized plate including a first TAC (Tri-Acetic-Cellulose) 12, a first PVA (Poly-Vinyl-Alcohol) 13 and a second TAC 14; the LC cell layer 15; a lower polarized plate including a first biaxial film 16, a second biaxial film 17, a second PVA 18 and a third TAC 19; a lower surface treatment layer 20. While the LC cell layer 15 is in dark state, the grains stand up, therefore the refraction along the thickness direction is caused and must be compensated by other retardation films, the refraction along the thickness direction is signed as Rth previously, hence, the installed second TAC 14, the first biaxial film 16 and the second biaxial film 17 are capable of compensating Rth of LC cell layer 15; While the LC cell layer 15 is in light state, the grains are inclined, therefore the refraction along the plane directions are caused and must be compensated by other retardation films, the refraction along the plane directions is signed as R0 previously, hence, the first biaxial film 16 and the second biaxial film 17 are capable of compensating R0 of LC cell layer 15. It is now that all of the refractions being compensated. Other layers, the upper surface treatment layer 11 and the lower surface treatment layer 20, are provided to have characters of protection, anti-glare, anti-reflection, scratchproof, anti-pollution, anti-static, etc; the first PVA 13 and the second PVA 18 are polarized plates to percolate light for purifying; the first TAC 12 and the third TAC 19 are with protection feature.

Above is the first preferred embodiment, however, there are some other alignments for the first TAC 12, the first PVA 13, the second TAC 14, the first biaxial film 16, the second biaxial film 17, the second PVA 18 and the third TAC 19, that is, other two preferred embodiments, which are: a second preferred embodiment has an upper polarized plate of a TAC, a PVA, a first biaxial film and another TAC aligned from top to bottom and a lower polarized plate of a second biaxial film, a PVA and a TAC aligned from top to bottom as well; a third preferred embodiment has an upper polarized plate of a TAC, a PVA, a first biaxial film and a second biaxial film aligned from top to bottom and a lower polarized plate of a TAC, a PVA and another TAC.

For the material of TAC afore mentioned, it can be instead of PC or COC.

Further, in order to that the retardation device of the present invention having effects of increasing view angle, contrast in full view angle and saturation, the lower polarized plate in the first preferred embodiment has two biaxial films. Based on the compensations of the two biaxial films, a glow level in dark state is the lowest, especially the compensations being better in the scopes of 45° to 225° and 135° to 315°. As a conclusion, the contrast value will be greater than 20 while in full view angle; on the other hand, color saturation is specially and relatively promoted on account of the two biaxial films.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A retardation device for a liquid crystal display comprising:
   an upper retardation set having a plurality of retardation layers, the plurality of retardation layers of the upper retardation set being aligned from top to bottom as a first transparent substrate, a polarized component and a second transparent substrate;
   a lower retardation set having a plurality of retardation layers, the plurality of retardation layers of the lower retardation set being aligned from top to bottom as a first biaxial film, a second biaxial film, a polarized component and a third transparent substrate;
   a LC cell layer between the upper retardation set and the lower retardation set.

2. The retardation device for the liquid crystal display as cited in claim 1, wherein the each of the first, second and third transparent substrates is selected from the group consisting of TAC, PC, and COC.

3. The retardation device for the liquid crystal display as cited in claim 1, wherein the polarized component is PVA.

* * * * *